Patented July 4, 1933

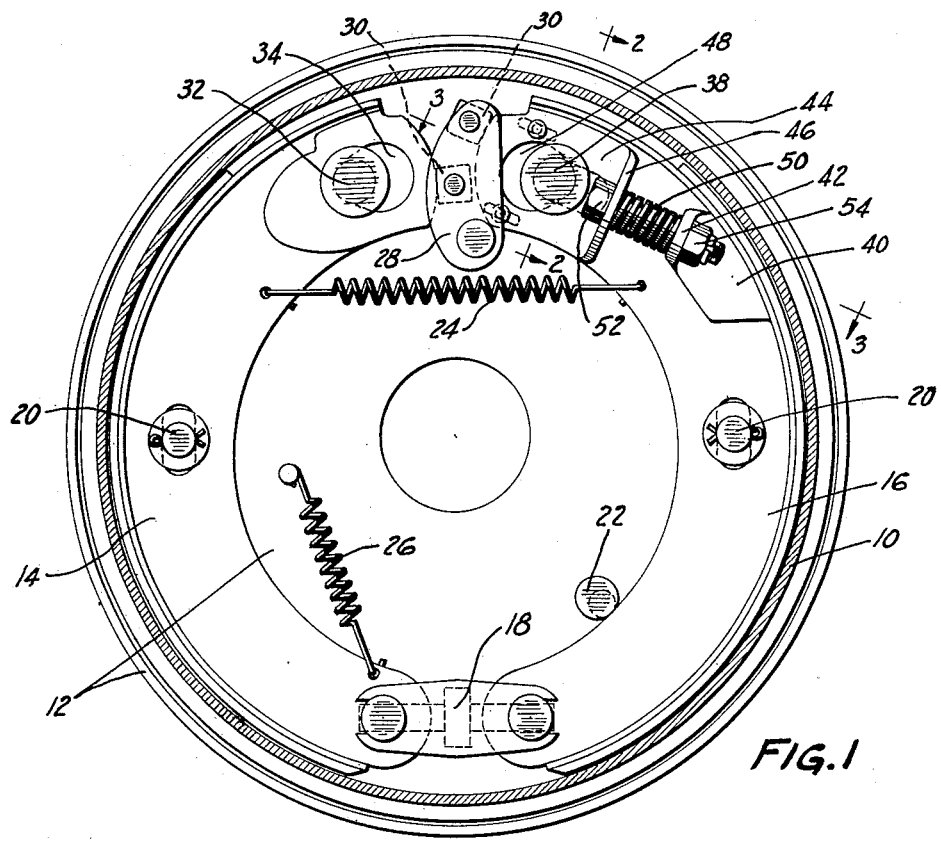
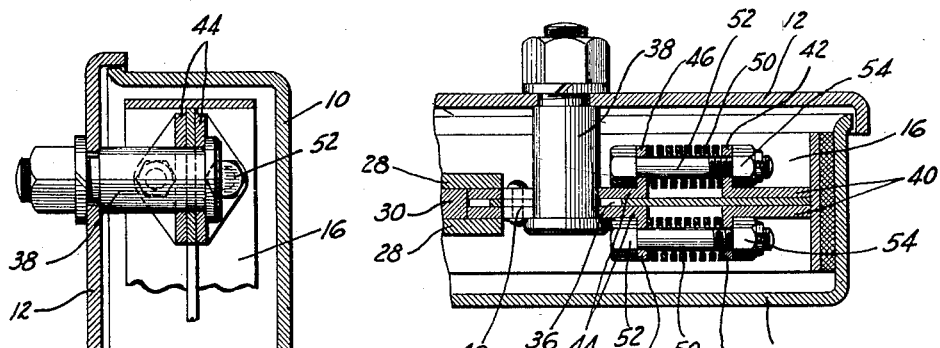

1,916,881

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 15, 1930. Serial No. 488,743.

This invention relates to brakes, and is illustrated as embodied in an internal expanding automobile brake of the shiftable-anchorage type. An object of the invention is to guard against harsh action of the brake, especially "grabbing", and thereby permit the use of a wider range of friction facings or linings, by arranging the brake anchorage to yield, for example through one or more springs, when a predetermined force is exerted, thereby withdrawing the brake friction means from the cam or its equivalent and automatically easing off on the brake.

Various features of novelty relate to the incorporation of an anchorage of this type in a shiftable-anchorage brake, to the mounting of the springs in the anchorage, and to other novel and desirable constructions and arrangements which will be apparent from the following description of the illustrative embodiment shown in the accompanying drawing, in which:

Figure 1 is a vertical section through the brake, just inside the head of the brake drum, showing the brake shoes in side elevation;

Figure 2 is a partial radial section through the brake, on the line 2—2 of Figure 1, showing one of the anchors; and Figure 3 is a partial section on the line 3—3 of Figure 1, showing one mounting of the springs.

The brake selected for illustration includes a rotatable drum 10, at the open side of which is a support such as a backing plate 12, and within which is the brake friction means, shown as including floating shoes 14 and 16 connected by an adjustable floating joint 18. Suitable steady rests 20, stops 22, and main and auxiliary return springs 24 and 26, may be provided. The brake may be applied by any suitable means such as a cam lever 28 having thrust blocks 30 engaging the ends of the shoes.

The present invention relates to the brake anchorage. Shoe 14 may be allowed to anchor directly on an anchor post 32 carried by the backing plate, when the vehicle is moving backward (drum turning clockwise), the shoe being formed with an elongated slot 34 embracing the anchor post. The usual anchorage, however, with the vehicle moving forward and the drum therefore turning counter-clockwise, is a yielding one in order to limit the braking effect as described above.

To this end, the shoe 16 is slotted at 36 so that it can move freely in circumferential direction, the slot 36 embracing another anchor post 38 carried by the backing plate. A pair of stampings 40 welded to opposite sides of the shoe web are formed with laterally-projecting flanges 42 having openings. A pair of anchor parts or stampings 44, also having oppositely-projecting flanges 46 formed with openings, are provided with elongated openings 48 corresponding to the openings 34 and which embrace the anchor post 38.

The yielding effect, in the arrangement illustrated, is secured by coil compression springs 50 of adjustably-predetermined tension, sleeved on bolts 52 extending through the openings in flanges 42 and 46, the tension being adjusted by tightening or loosening nuts 54 on the bolts. Further adjustments are secured by selecting springs of different deflection rate.

While one illustrative embodiment has been described in detail, it is not my intention to limit the scope of the invention to that particular embodiment, or otherwise than by the terms of the appended claims.

I claim:

1. A brake comprising a drum and friction means having one anchorage when the drum is turning in one direction and another anchorage when the drum is turning in the other direction, at least one of said anchorages being yieldable, and said anchorages acting on different parts of the friction means.

2. A brake comprising a drum and friction means anchoring at one end when the drum is turning in one direction and anchoring at the other end when the drum is turning in the other direction, the anchorage in at least one of said directions of rotation being yieldable.

3. A brake comprising a drum and friction means shifting its anchorage from one end to the other when the drum rotates in opposite directions, and including a spring through which the friction means anchors in one direction of drum rotation and unyielding means through which the friction means anchors when the drum is turning in the other direction.

4. A brake comprising a drum and friction means shifting from one anchorage to another and anchoring at different parts of the friction means when the drum rotates in opposite directions, and including a spring through which the friction means anchors in one direction of drum rotation.

5. A brake comprising a drum and friction means anchoring at opposite ends when the drum rotates in opposite directions, and including a spring through which the friction means anchors in one direction of drum rotation, and unyielding means through which the friction means anchors when the drum is turning in the other direction.

6. A brake comprising a drum and friction means anchoring at opposite ends when the drum rotates in opposite directions, and including a spring through which the friction means anchors in one direction of drum rotation.

7. A brake comprising a pair of spaced-apart anchors, floating friction means anchorable directly on one of said anchors, and a spring through which said means anchors on the other of said anchors.

8. A brake comprising a pair of spaced-apart anchors, floating friction means transmitting its torque to one or the other of said anchors, and a spring through which said means anchors on the one of said anchors.

9. A brake anchorage comprising an anchor post, a friction device having a slot embracing said post, a part mounted directly on said post, and a spring confined between said part and a portion of the friction device.

10. A brake anchorage comprising an anchor post, a friction device having a slot embracing said post, a part mounted directly on said post, and a pair of springs mounted on opposite sides of the friction device and confined between said part and portions of the friction device.

11. A brake anchorage comprising an anchor post, a part mounted thereon and having laterally projecting flanges, a friction device having corresponding laterally-projecting flanges, bolts passing through the flanges, and springs sleeved on the bolts and confined between the flanges.

12. A brake anchorage comprising an anchor post, a part mounted thereon and having a laterally projecting flange, a friction device having a corresponding laterally-projecting flange, a bolt passing through the flanges and a spring sleeved on the bolt and confined between the flanges.

13. A brake comprising a drum and friction means anchoring at one end when the drum is turning in one direction and anchoring at the other end when the drum is turning in the other direction, an abutment against which said friction means is designed to anchor in at least one of said directions of rotation, resilient means for determining the maximum torque which said abutment is capable of resisting without movement, and means for adjusting the yielding strength of said resilient means.

14. A brake comprising a drum and friction means anchoring at opposite ends when the drum rotates in opposite directions, an abutment against which said friction means is designed to anchor in one direction of drum rotation, resilient means including a spring for determining the maximum torque of which said abutment is capable of resisting without movement, and means for adjusting the yielding strength of said resilient means.

15. A brake anchorage comprising an anchor post, a friction device having a slot embracing said post, a part mounted directly on said post, a spring confined between said part and a portion of the friction device, and means for adjusting the yielding strength of said spring.

16. A brake comprising a drum and friction means anchoring at one end when the drum is turning in one direction and anchoring at the other end when the drum is turning in the other direction, anchor means comprising a loaded spring for taking the braking torque in at least one of said directions, said spring being adapted to yield when the braking torque exceeds the load on said spring whereby the anchorage in at least one of said directions of rotation is yieldable.

17. A brake comprising a drum and friction means anchoring at opposite ends when the drum rotates in opposite directions, an abutment against which said friction means is designed to anchor in one direction of drum rotation, and means associated with said abutment comprising a loaded spring for transferring the braking torque to said abutment, said spring being adapted to yield when the braking torque exceeds the load on said spring, to limit the maximum possible torque.

18. A brake anchorage comprising an anchor post, a friction device having a slot embracing said post, a part mounted directly on said post and a loaded spring confined between said part and a portion of the friction device, whereby the anchor is yieldable under braking torques which exceed the load of said spring.

In testimony whereof, I have hereunto signed my name.

ADIEL Y. DODGE.